(12) United States Patent
Sada

(10) Patent No.: US 9,960,634 B2
(45) Date of Patent: May 1, 2018

(54) INTELLIGENT FUNCTION INSTALLING POWER STORAGE AND GENERATION PACKAGE SYSTEM

(75) Inventor: Tsutomu Sada, Otsu (JP)

(73) Assignee: GEM CORPORATION, Otsu (JP)

( * ) Notice: Subject to any disclaimer, the term of this patent is extended or adjusted under 35 U.S.C. 154(b) by 1030 days.

(21) Appl. No.: 13/315,403

(22) Filed: Dec. 9, 2011

(65) Prior Publication Data

US 2012/0202094 A1 Aug. 9, 2012

(30) Foreign Application Priority Data

| Dec. 10, 2010 | (JP) | ................................ | 2010-8528 |
| Feb. 10, 2011 | (JP) | ................................ | 2011-1088 |
| Jul. 31, 2011 | (JP) | ................................ | 2011-178136 |

(51) Int. Cl.
*H01M 16/00* (2006.01)
*H02J 7/35* (2006.01)

(52) U.S. Cl.
CPC .................................. *H02J 7/355* (2013.01)

(58) Field of Classification Search
CPC ...... H01M 10/44; H01M 10/46; H01M 16/00; H02J 1/00; H02J 7/00; H02J 7/02
See application file for complete search history.

(56) References Cited

U.S. PATENT DOCUMENTS

| 5,714,869 A | 2/1998 | Tamechika et al. |
| 2009/0039705 A1 | 2/2009 | Lyman et al. |
| 2009/0296442 A1* | 12/2009 | Chang .................... H02J 7/0054 363/142 |
| 2010/0156339 A1* | 6/2010 | Hoffman .................. H02S 30/20 320/101 |
| 2011/0181233 A1* | 7/2011 | Mino ..................... H02J 7/0027 320/101 |

FOREIGN PATENT DOCUMENTS

FR 2877510 A1 5/2006

OTHER PUBLICATIONS

European Search Report dated May 23, 2014 issued in corresponding EP 11192863 application (page 1).
English Translation Abstract of FR 2877510 published May 5, 2006.

* cited by examiner

*Primary Examiner* — Karie O'Neill Apicella
(74) *Attorney, Agent, or Firm* — Millen, White, Zelano & Branigan, P.C.; William Nixon

(57) ABSTRACT

Power generation and storage system and/or solar power generation and storage packaged panels and storage functions in a device and their installment of Signal UPS system device and this power equipment Station combined with various electric power generators.

The first aspect of his invention relates to Intelligent function installing Power generation and storage system, involving a control system of Charge-Discharge, Power storage and supplemental charge-discharge functions, packaging lithium ion rechargeable battery (LIB) (1) sole or a combination of LIB and capacitor-condenser as battery units, Charge-Discharge Control Unit (2) containing Charge-Discharge controller.

18 Claims, 7 Drawing Sheets

Solar panels in carry-bag form of folding both face sides and boxes of the pair panels Pair panels combined at hinge joint parts Back sides figures' of Figure 1
*Figure separated at hinge joint parts*

Side view of Figure 1
Operation parts and parts combined with hinges, and LED lights connected as an external device Real photograph
It shall be replaced parts' location dependent on each application in usage.

Bottom view of Figure 1

Solar's Panels Usage example of Figure 1

Solar Power generation and storage packaged unit

Real photograph

Mounting tools of locating the solar panel equipments for emergency.

A remote control type sunshine elevation angle adjustment tool and angle adjusting stand to follow a sunshine elevation through one year in each location Solar Power generation and storage packaged panel system Two combined panels system
(containing supplemental power generation and storage system)

Back side figure of Figure 9

Side view of Figure 9
(Right and left frames are completely closed)

Bottom view of Figure 9

Signal UPS system's Usage example of Figure 9

Mounting tool of locating Signal UPS system equipment in Figure 9
Those are modified based on Figure 8.

INTELLIGENT FUNCTION INSTALLING POWER STORAGE AND GENERATION PACKAGE SYSTEM

FIELD OF THE INVENTION

This invention relates to Intelligent function installing Power generation and storage system and/or Solar Power generation and storage packaged panel, and their installment of Power station packaged generation and storage functions in a device, and their installment of Signal Uninterruptible Power Supply (so called UPS) system device, and this power equipment Station combined with various electric power generators (1) Manufacturing technology of various battery module composited of light weight aluminum laminated film type lithium ion rechargeable battery cells and their cells combined, and protection technology of Power generation and storage equipment system by locating on thermal insulating layer and their system controlling technology are well known in public like non-patent bulletin 1 and 2 listed herewith. But those devices are not of light weight and portable.

(2) Electric Bulletin Board system installing UPS parts for public information as patent bulletin 1) and thin type street lights packaged with solar panel and lithium ion rechargeable battery (so called as LIB) as non-patent bulletin 1) are familiar, but Power generation and storage packaged system and/or solar panel type power generation and storage packaged system and/or UPS system installing solar power generation and storage combined panels are not available as a portable size, in particular.

BACKGROUND ART non-patent bulletin 1): Thin type street light packaged with solar cells and lithium ion battery (produced by Panasonic Co., Ltd. product name as EVERLEDS.
non-patent bulletin 2): JETNEKO Co., Ltd. as product name "SOLA-UNAGI NEO" as solar type portable generator, Lead Acid battery installed, gross weight 11 kgs.
patent bulletin-1): Public patent Tokukai-Heisei 9-179526 (Patent Claims coverage)

SUMMARY OF THE INVENTION

This invention proposes Intelligent function installing Power generation and storage system and/or solar power generation and storage packaged panels and their installment of Power station packaged generation and storage functions in a device and their installment of Signal UPS system device and this power equipment station combined with various electric power generators.

The First purpose of this invention is to attribute better by providing a light weight of efficient portable and mobile type Intelligent function installing Power generation and storage system and/or Solar Power s generation and storage packaged panel, and a power equipment Station combined with various electric power generators, especially effective in the events of disaster prevention and a disaster emergency.

The Second purpose of this invention is to attribute better by providing a particularly effective UPS system in order to maintain the function of Signal under an electricity power outage in the event of disaster emergency. What is the more, especially effective light weight and portable Intelligent function installing Power s generation and storage system and/or solar power generation and storage packaged panels and their installment of Power station packaged storage and generation functions in a device and this power equipment station combined with various electric power generators installed on Signal UPS system device is also included in this purpose.

BRIEF EXPLANATION OF DRAWINGS

FIGS. 1-8 of the First Aspect of this Invention;
FIG. 1: Flat figures of Intelligent function installing Power generation and storage system and/or Solar Power generation and storage packaged panel system—Solar panels in carry-bag form of folding both face sides and boxes of the pair panels combined at hinge joint parts.
FIG. 3: Side views of FIG. 1—operation parts and parts combined with hinges, and LED lights connected as an external device
FIG. 4: Bottom view of FIG. 1
FIG. 5: Solar Panels' Usage examples of FIG. 1 conforming to Claims 1-3
FIG. 6: Solar Power generation and storage packaged unit in this invention conforming to Claim 7
FIG. 7: Mounting tools of locating the Solar panel equipments in this invention conforming to Claim 8
FIG. 8: A remote control type sunshine elevation angle adjustment tool and angle adjusting stand to follow a sunshine elevation through one year in each location
Explanation of Ref. No.
in FIGS. 1-8;
1. Battery unit as Power generation and storage unit: lithium ion rechargeable batteries (LIB), capacitor-condenser package
2. Charge-discharge controlling system and program on a my-computer unit and digital power supply volume index being indicated on LCD as charge-discharge controlling unit
3. The system controlling unit of 2.
4. DC-AC inverter system controlling apparatus interface parts
5. Human sensitive sensor and Light Emitting Diode (so called LED) lamp
6. DC-DC converter port
7. External brightness sensor
8. Solar panel combined port: array configuration port
9. USB port
10. Cooling fans
11. My-computer's switch and Operation starting pilot lamp
12. Solar cell lead code part
13. Main switch and Operation starting pilot lamp
14. Human sensitive sensor
15. Human sensitive sensor LED lamp
16. External LED lighting port
17. Mounting type volts holding sunshine adjusting tools
18. Lock of a pair panels in hook type
19. Holding hinges for a pair panels
20. Grids for the panels in carry-bag form
21. Lid of power generation and storage system box side
22. Heat insulating layer part of Solar Panel backside: thermal insulation paint coated or thermoplastic insulation sheet sealed
23. Externally mounted LED devices: lamps, illumination, LED signals, guidance board, warning LED indication board, LED advertisement board and the like
24. Flat area setting stands: indication of sunshine elevation angles in seasons
25. Holding volts of Flat area setting stands 26. Emergency power supply mounting devices: remote controlling apparatus of sunshine elevation angles on solar panels mounting table
27. AC power supply port Explanation of FIGS. 9-14 of the Second Aspect of this Invention;

Explanation of Ref. No. in FIGS. 9-14;

Figure 1:
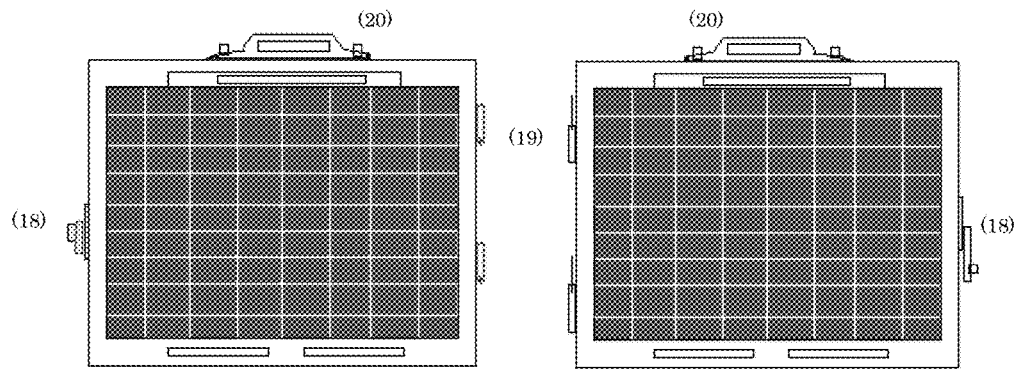
Figure 1:
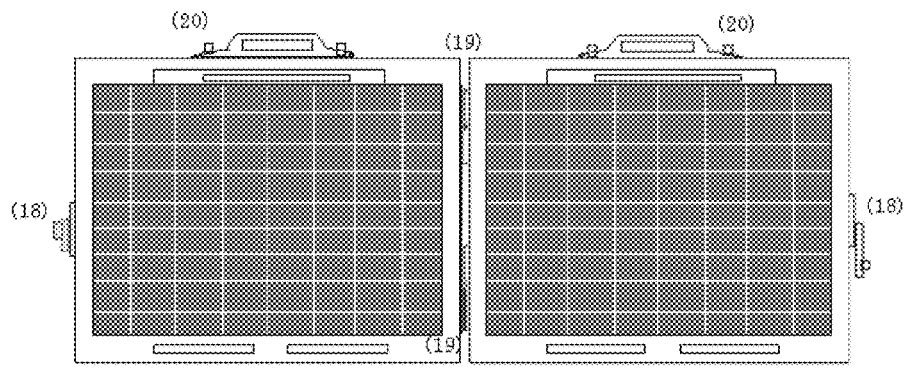
Figure 2A:
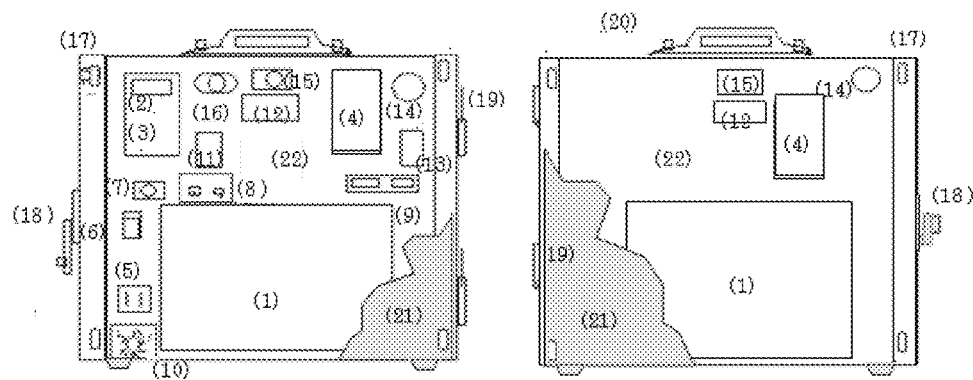
FIGS. 2A and 2B: Back sides' figures of FIG. 1—a separating system and combined system.
Figure 2B:
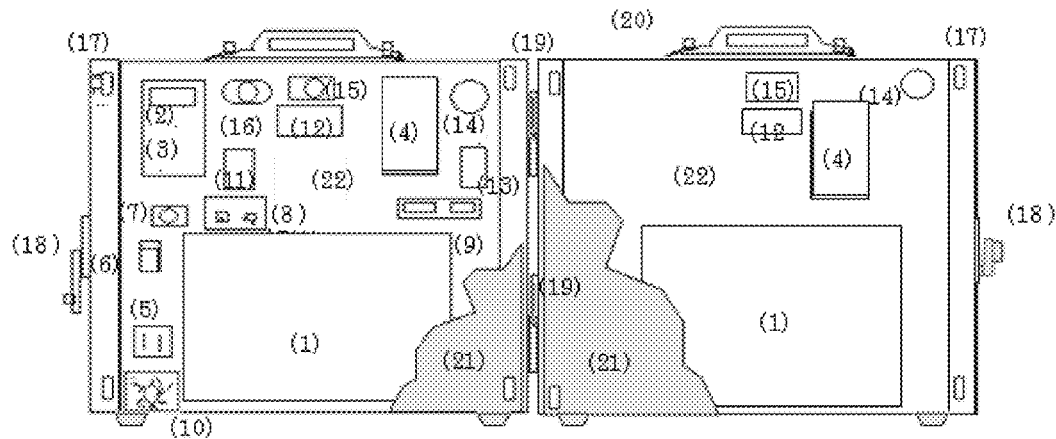
Figure 3:
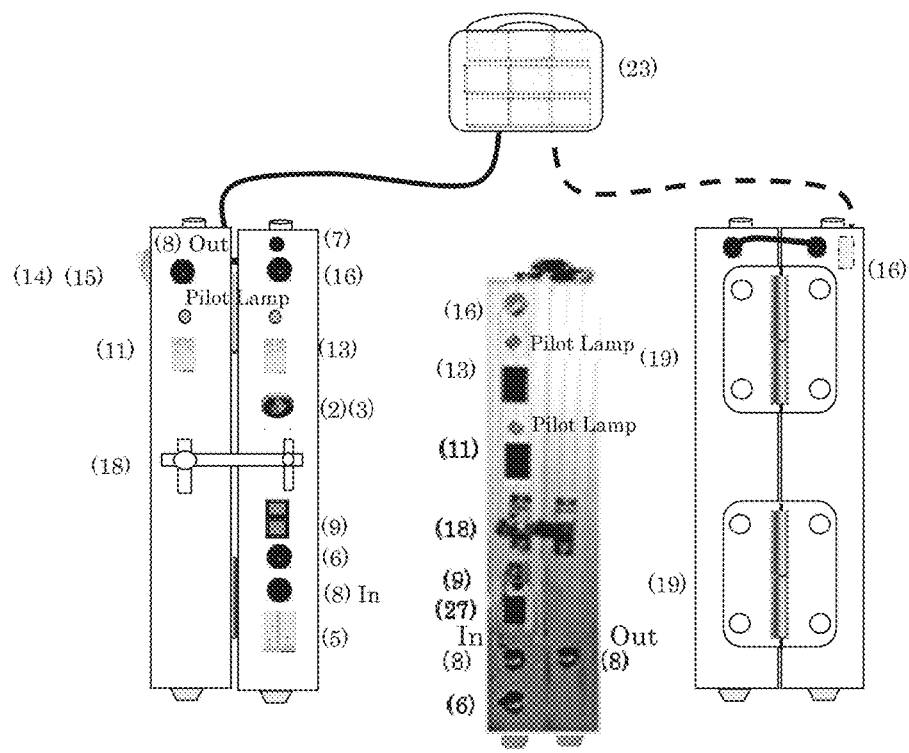
Figure 4:
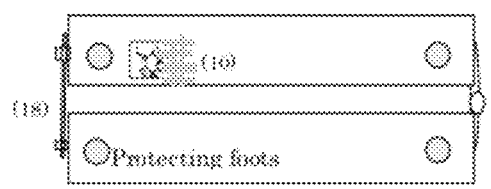
Figure 5:
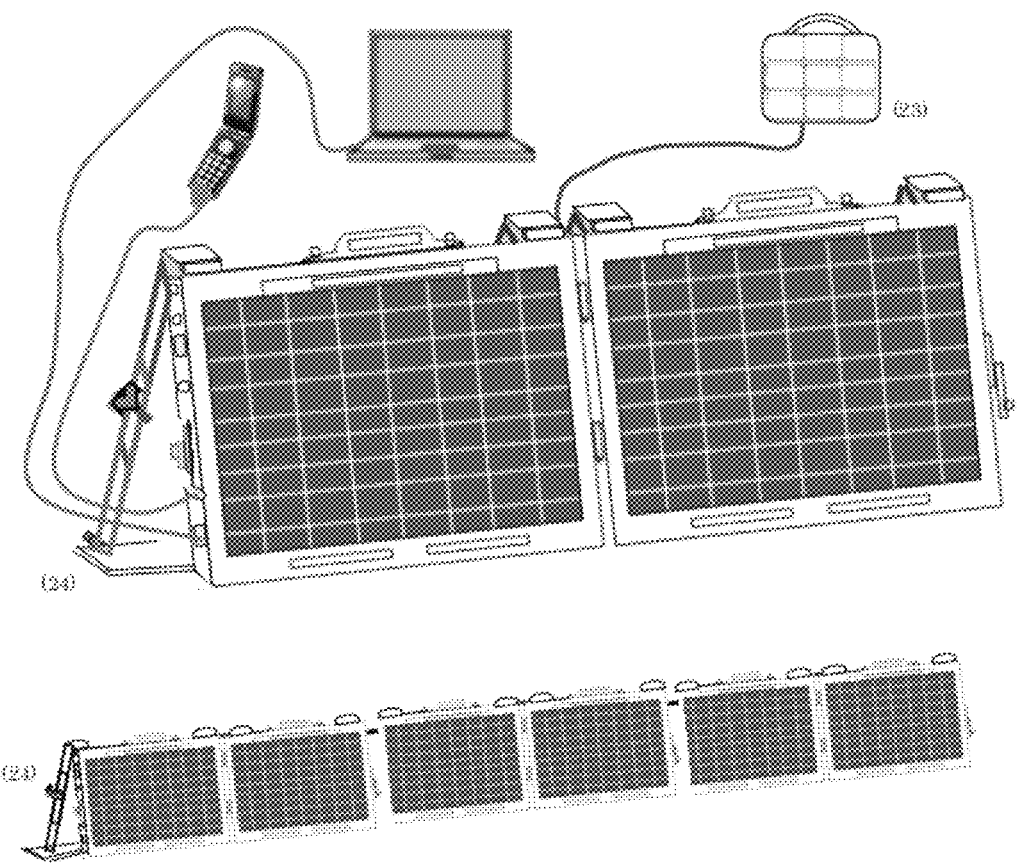
Figure 6:
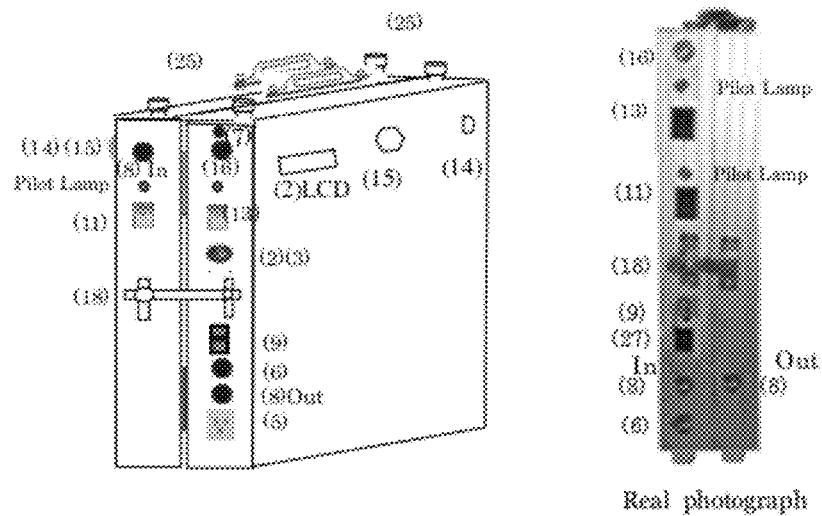
Figure 7:
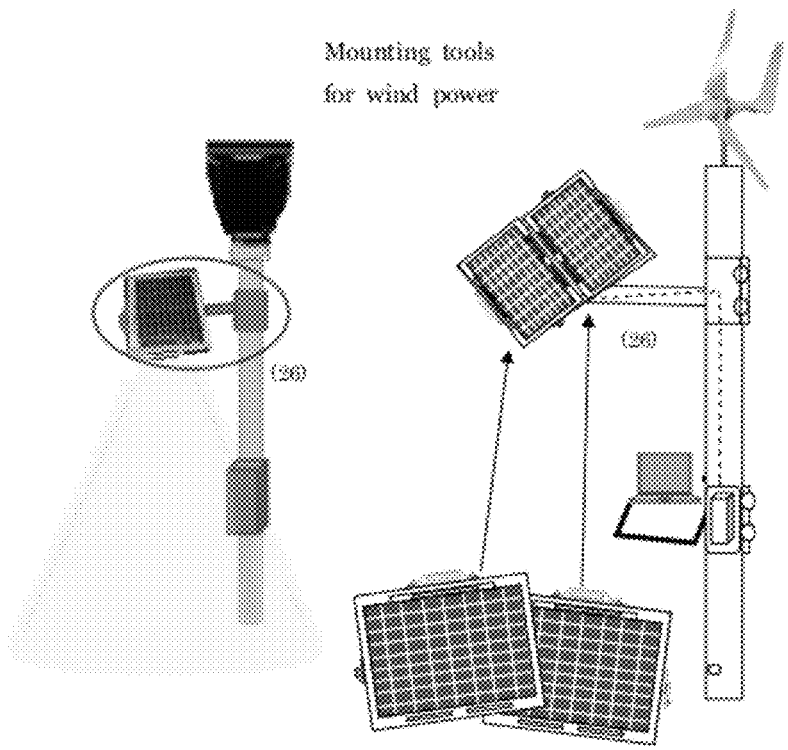
Figure 8:
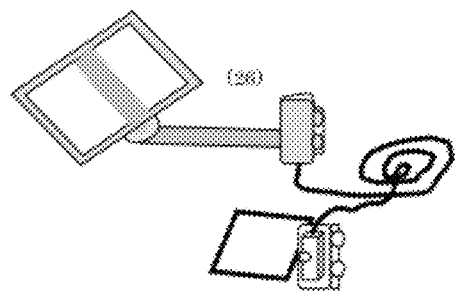
Figure 9:
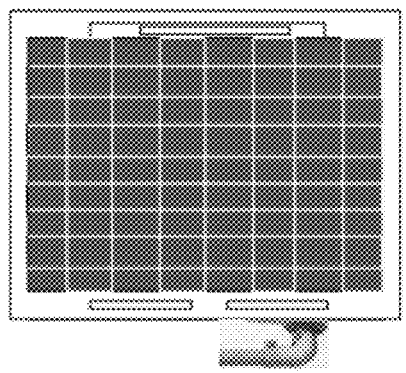
FIG. 9: Flat figures of Signal UPS system equipment installed Intelligent function installing Power generation and storage system and/or Solar Power generation and storage packaged panel system and a single or pair of the Signal UPS system panel(s) combined main system part and supplemental battery unit part, mounting joint pipes in a water proof type for cabling
Figure 9:
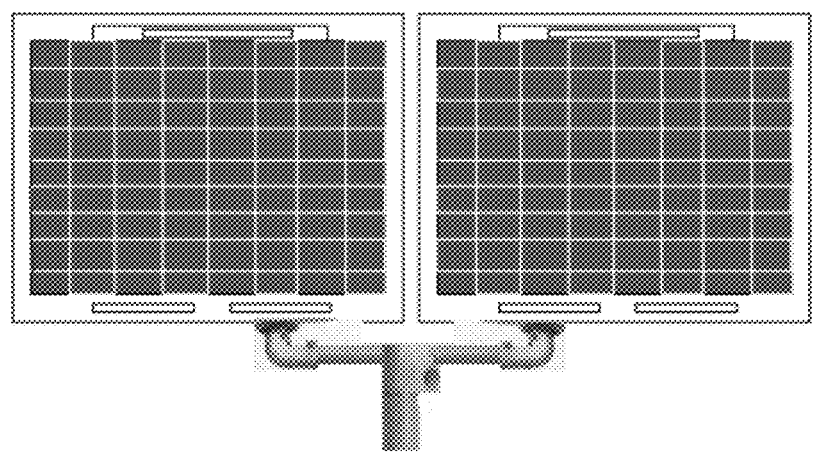
Figure 10:
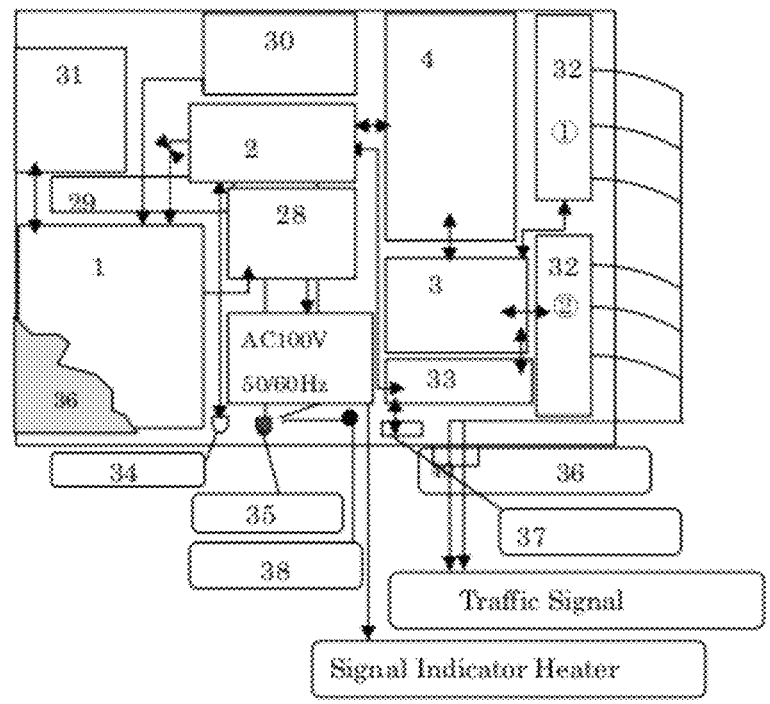
FIG. 10: Back side figure of FIG. 9—Signal UPS system panel
Figure 11:
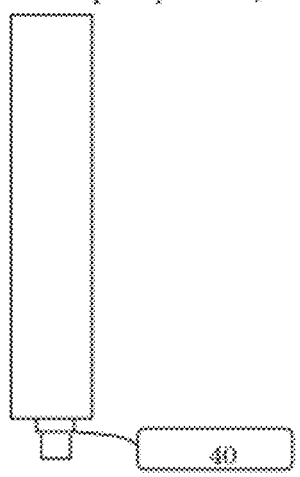
FIG. 11: Side view of FIG. 9—all round complete water proof type
Figure 12:
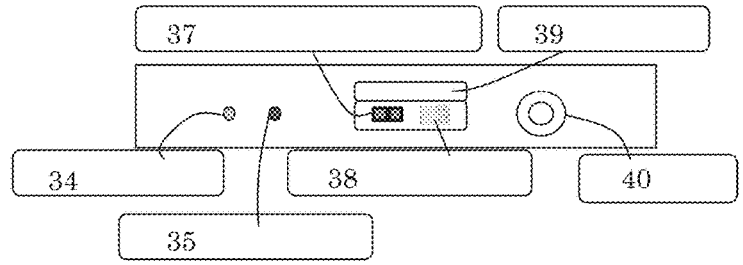
FIG. 12: Bottom view of FIG. 9
Figure 13:
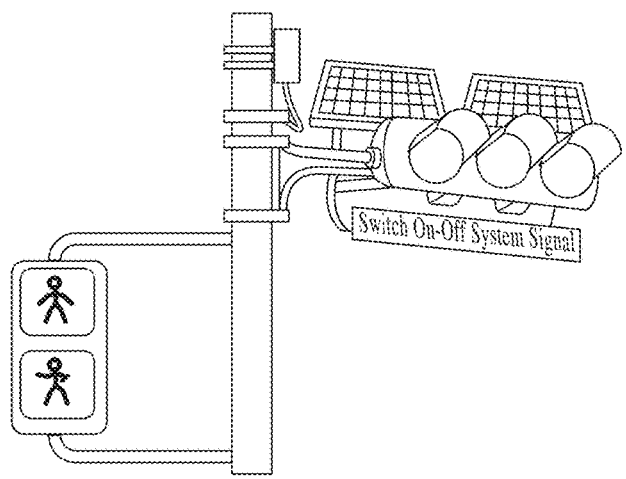
FIG. 13: Signal UPS system's Usage example of FIG. 9
Figure 14:
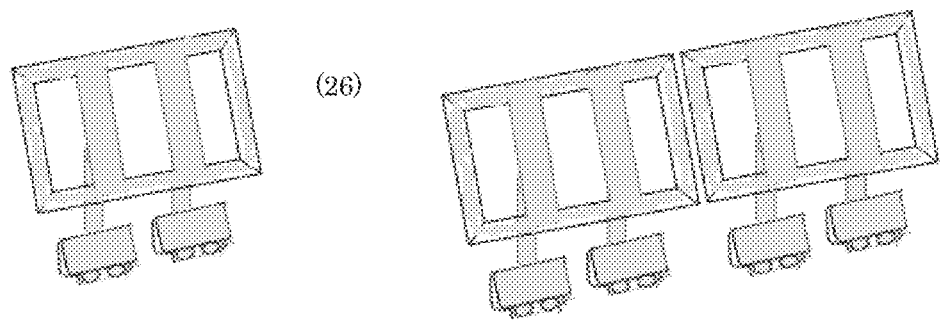
FIG. 14: Mounting tool of locating Signal UPS system equipment in FIG. 9

1. Battery unit as Power generation and storage unit: lithium ion rechargeable batteries, capacitor-condenser package described.
2. Charge-discharge control unit
3. The system control unit
4. DC-AC inverter system controlling apparatus interface parts
28. UPS system part involving Blackout detector
29. AC inverter
30. Solar power supply
31. Digital LCD indication of power supply
32. Circuit 1 and 2 as control circuit of traffic signal 1 and pedestrians' signal 2, respectively
33. Data memory apparatus
34. Temperature and humidity sensor
35. Indication lamp in working
36. Back lid of UPS system box
37. USB port for Data accumulation
38. Main switch
39. Water proof cover lid
40. Joint part of cord lines

PREFERRED EMBODIMENT OF THE INVENTION

This First purpose is to attribute better by providing Intelligent function installing Power storage and generation system and/or solar power generation and storage packaged panel conforming to Claim 1, involving a control system of Charge-Discharge, Power storage and supplemental charge-discharge functions, packaging lithium ion rechargeable battery (so called LIB) (1) sole or a combination of LIB and capacitor-condenser as battery units, Charge-Discharge Control Unit (2) containing Charge-Discharge controller, Protection circuit against over-charge and over-discharge operations, thermal fuse for a protection and detection against IC circuit system destroy, thermistor and a back flow preventing diode, a system control unit (3) involving input-output controller and containing regulative diode (so called CRD), due point sensor (so called DPS), terminal regulator, float type flow-meter, pulse width modulation (so called PWM), a currency control unit interface parts (4) involving direct-current-alternative current (so called DC-AC) inverter system.

This Second purpose is to attribute better by providing Signal UPS system in claim 12, involving Intelligent function installing Power generation and storage system and/or solar power generation and storage packaged panels and UPS equipment (28) installing a blackout detector.

In this invention, the power storage battery unit (1) is of a unit performing power storage function under over-charge and over-discharge control, the charge-discharge control unit (2) is of a unit performing a system control in charging and discharging operations, the system control unit (3) is of units performing a system control in supplementary for charge-discharge operations as well as operating Signals in required conditions, currency control unit interface part (4) is of a unit for operating an interface control between power storage unit and system control unit. What is the more, those each unit can be installed function of a digital indication controlling figures of voltage, current, electric power and the like.

Also, thermal fuse for a protection and detection against IC circuit system destroy by detecting an increase of internal temperature are selected in two kinds such as self or manual return type, or no return and exchanging type. UPS equipment (28) is of connecting electrically battery units (1), charge-discharge control unit (2), system control unit (3) and currency control unit interface parts (4), and of operating immediately at electric blackout and instant detection by the blackout detector in the emergency disaster events. DC-AC inverter system in currency control unit interface parts (4) is indicated as DC-AC convention inverter and currency control unit interface parts (4) is indicated as light weight and portable type AC-DC converter or internal installment with a pair of AC-DC inverter and light weight and portable DC-DC converter.

This First purpose is to attribute better by providing human sensitive sensor, brightness sensor, vibration sensor, thermal and humidity sensor and LED lighting system as selected for installing at least one kind of them in Claim 2.

This First purpose is to attribute better by providing mounting port of lighting devices as LED lights in particular, a controller of light operating function with human sensitive sensor, brightness controller operating light on and off by brightness detection, external charging port to make supplement at shortage of electric power, ports in use available for conventional consumers' electronics such as mobile phones, personal computers, electric heaters, electric disinfector, and ports for AC 100V usage, AC 200V three phase, AC voltage ports similar to AC ports, external mounting AC-DC converters, external mounting DC-DC convertor up to 249 V as selected for installing at least one kind of them in Claim 3.

DC-AC inverter installed is to attribute better with a type of inverters available in sine wave although it is acceptable in either sine wave or pseudo-sine wave. Lighting devices are adaptable better with less electricity consumption and long life type LED lighting devices. In addition, light weight and portable type DC-DC converters are adaptable better with DC-DC convertor charging from vehicle battery and charging as a supplementary power source from its cigar lighter part with a connector mounted externally.

This First purpose is to attribute better by providing Intelligent function installing Power generation and storage system and/or solar power generation and storage packaged panel described either in Claim 1 to 3 and/or solar power generation and storage packaged panels in Claim 4, installed internally them inside of solar panels frames which LIBs inside of Power storage unit are of cylindrical cans, aluminum square cans or aluminum laminating cells packaged modules and their combination modules in battery unit (1)

and also LIBs or capacitor-condensers are installed charge-discharge protection circuits, thermal fuses and thermistor in light weight battery cell at less than 10 g/Watt. Those power panels are specified in small portable size and the power maximum (so called Pm) in range of 5 W to 50 W in each panel unit and surface square measurement in less than 110 cm$^2$/W and the thickness of the solar panel's frame in less than 50 mm in claim 4.

In this specification, light weight Power storage battery at less than 10 g/W is attributed better by providing the weight at lighter than 990 g with 12V-120 W battery unit and the weight 1590 g with 12V-180 W battery unit as two specification cases. The minimum value of the light weight Power storage battery unit is attributed better by providing the weight at not less than 4.5 g/W and the best by providing the weight at not less than 6 g/W. In addition, the minimum size of one solar panels' surface square measurement is the best by providing at not less than 70 cm$^2$/W and better by providing at not less than 90 cm$^2$/W.

This First purpose is to attribute better by providing to locate a thermal insulation layer on the backside of solar cells compositing thermal insulation paint or thermoplastic resin encapsulating sheet performing the restraining function for maintaining an external temperature of the devices at lower than 55 degree C. (° C.) in increasing higher a temperature on the surface of solar panels duration of sunshine for the purpose of protecting internal parts against deterioration and/or breaking down of Power generation and storage system caused by internal and external thermal increase, and by providing at lease one of devices such as thermal sensors, cooling fan operating system starting its system by the temperature detection at 50 degree C. (° C.) level, Internal temperature protecting system by the temperature detection at 5 degree C. (° C.) level, power storage volume ratio controlling discharge possible voltage and electric current for power storage battery unit, and digital displaying indicator in generating electric power with solar cells in Claim 5.

These deterioration and/or break down are meant for parts described in this invention such as parts and/or system related with power sources, IC circuit parts and the like.

Thermal insulation paints on thermal insulation layers are listed on acryl silicone type paint, alkoxiylan compound type paint, ceramic powder paint. Thermoplastic insulation sheet in this invention is of polyethylene (so called PE), polypropylene (so called PP), polystyrene, carboxylic acid modified PE, carboxylic acid modified PP, ethylene-vinyl acetate copolymer (so called EVA), poly-phenylene sulfate (so Called PPS), poly tetra fluoro ethylene (so called PTFE) and other heat resistant resin and the like. And also those paints and sheet in this invention is attributed better for providing mixture in the paint solution or non-inflammable treatment by impregnation of non-inflammable type ion conductive polymer containing ionic liquid material and ion conductive dopant as CP Kaizer produced by Piotrek Co., Ltd. in use.

This First purpose is to attribute better by providing light weight and portable type carry bag form in folding two panels in range of 5 to 50 W and also a box form in not wider than 50 mm thickness in each panel unit, and in portable type carried easily by a hand on weights of not more than 300 g/W per maximum power output of solar cell panel unit, and mounting hand grips and a hook preventing to be opened the two panels under carriage in Claim 6.

Herewith, a thickness of one box unit in the carry bag is better for not wider than 40 mm thickness and the best for not wider than 35 mm thickness and the weight per maximum power outlet of solar cell panel unit is better for not more than 200 g/W and the best for not more than 150 g/W. The lowest weight per maximum power outlet of solar cell panel unit is better for not less than 50 g/W and the best for not less than 80 g/W. As an example, the overall weight of solar cell panels in one set of two panels which length and breadth is not less than 40 mm respectively at 12V 120 W specification is better for not more than 5 kgs.

This First purpose is to attribute better by providing Intelligent function installing Power generation and storage system and/or solar power generation and storage packaged panels mounting hand grips and a hook preventing to be opened the two panels under carriage and the box holding in two units of solar cell panels by utilizing hinges either firmed type one or ones removable for sole use of each solar power storage and generation packaged panel in Claim 7.

This First purpose is to attribute better by providing a power station combining Intelligent function installing Power generation and storage system and/or solar power generation and storage packaged panels in Claim 1 to 7 mounting at least one of devices such as Signal LED diodes freezing protection function by installing a temperature controlling sensor, LED lighting devices operating with a human sensitive sensor function, earthquake early warning signal transmission function operated by a seismic triggering sensor, a surveillance camera and video at disaster events, Global Positioning System (so called GPS) remote communication unit, an emergency warning report system, quick starting system of motors and drives, and mounting the Intelligent function installing Power generation and storage system and/or solar power generation and storage packaged panels on standing street lights and/or telegraph poles installing solar cell and/or wind power units as their supplementary power source, and combining with solar cells or wind power or wave activating power generation as natural energy generation apparatus or fuel cells to be enhanced overall power generation capacity, that is, by providing Power generation and storage packaged apparatus station involving various power generators controlling functions of Power generation operation—Storage or supplementary charging operation—Discharging operation in Claim 8.

This First purpose is to attribute better by providing a power station combining Intelligent function installing Power generation and storage system and/or solar power generation and storage packaged panels in Claim 1 to 7 mounting at least one of devices such as Signal LED diodes freezing protection function by installing a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and mounting the Intelligent function installing Power generation and storage system and/or solar power generation and storage packaged panels on standing street lights and/or telegraph poles installing solar cell or wind power units as their supplementary power source, and in a solar power generation the best efficient rate of solar cell generation is attributed better by utilizing an angle adjustment stand of sunshine elevation on a flat location to keep the best angle of sunshine through a year or a remote control apparatus of the sunshine angle adjustment mounted at street lights or telegraph poles or other high position, and combining with solar cells and/or wind power or wave activating power generation as natural energy generation apparatus or fuel cells to be enhanced overall power generation capacity, that is, by providing Power generation and storage packaged apparatus station involving various power generators controlling functions of Power generation operation—Storage or supplementary charging operation—Discharging operation in Claim 9.

This First purpose is to attribute better by providing Power generation and storage packaged apparatus station by combining Intelligent function installing Power generation and storage system described in Claim 1 to 7 with various environmentally compatible power generators and the power generation and storage unit size of conventional power generator is a small size power generation and storage apparatus possible reduction rate in not less than 50% of measurement size and in light weight at not more than one Second (½) weight in comparison with that of lead acid storage battery and also setting feasibly at height of not lower than 150 cm required for a flood disaster prevention or limiting a transfer and/or a location condition of power storage batteries in disaster area in Claim 10.

This conventional power generator are utilized better with a diesel engine and the like, and the disaster area infeasible to transfer and limited location condition is meant a location in handling hard with big size and heavy batteries such as Lead acid storage batteries.

This First purpose is to attribute better by combining Intelligent function installing Power generation and storage system described in Claim 1 to 7 with Power generation and storage packaged apparatus station involving various environmentally compatible power generators such as solar cells or wind power or wave activating power generation as natural energy generation apparatus or fuel cells to be enhanced overall power generation capacity and the power generation and storage unit size of power generators is a power generation and storage apparatus possible reduction rate in not less than 50% of measurement size and in light weight at not more than one Second (½) weight in comparison with that of lead acid storage battery and also setting feasibly at height of not lower than 150 cm required for a flood disaster prevention or limiting a transfer and/or a location condition of power storage batteries in disaster area in Claim 11.

In this invention, Intelligent function installing Power generation and storage system and/or solar power generation and storage packaged panels are described in Claim 1 to 11.

Power generation and storage system and/or solar power generation and storage packaged panels described herewith of this invention are obtained Intelligent function installing Power generation and storage system and/or solar power generation and storage packaged panels installed jointly light weight and portable form as well as controlling system in charge-discharge, power generation and supplementary charge-discharge operations as specifically efficient roles at electric blackout in the disaster prevention or the emergency disaster events, of which functions are obtainable as Power generation and storage packaged apparatus station.

Those functions are to maintain safely and steadily telecommunication operations, disaster pre-warnings, notification and update information, night lightings and the like in peoples' lifelines.

Also, the Power generation and storage packaged apparatus Station fully charged are utilized as an emergency power supply by mounting those apparatus on standing street lights poles, solar lights poles and/or wind power poles with a complete water-proof type box form easily mounted in free hands. Those functions' operations of this invention are widely expanded the telecommunication functions and also the establishing places through utilizing by jurisdictions of telecommunication system and devices and/or disaster victims in the lifelines. In addition, those functions of this invention are utilized a supplementary power supply for consumer electronics such as personal computers, mobile phones including smart phones, i-Pad, mobile game devices, portable digital camera, video and the like, and for outdoor's LED lightings, amusements such as small and simple music, movies or illumination events and the like, and decorations for advertisement. Those functions are also utilized as light weight and portable supplementary power supply in military uses like mobile communication equipments.

Next, this Second purpose is explained its efficient and effective specifications hereinafter. In the beginning, this Second purpose is attributed by providing Signal UPS power supply system in Claim 12 same as previously described, which is the second aspect of this invention.

The Second purpose is attributed better by providing Signal UPS power supply system in Claim 13 involving Intelligent function installing Solar Power generation and storage packaged panels in Claim 12, installed internally them inside of solar panels frames which LIBs inside of Power storage unit are of cylindrical cans, aluminum square cans or aluminum laminating cells packaged modules and their combination modules in battery unit (1) and also LIBs or capacitor-condensers are installed charge-discharge protection circuits, thermal fuses and thermistor in light weight battery cell at less than 10 g/Watt. Those solar panels are specified in small portable size and "Pm" (power maximum) in range of 5 W to 50 W in each panel unit and surface square measurement in less than 110 $cm^2$/W and the thickness of the solar panel's frame in less than 50 mm. In this specification, light weight Power storage battery at less than 10 g/W is attributed better by providing the weight at lighter than 990 g with 12V-120 W battery unit and the weight 1590 g with 12V-180 W battery unit as two specification cases. The minimum value of the light weight Power storage battery unit at less than 10 g/W is attributed better by providing the weight at not less than 4.5 g/W and the best by providing the weight at not less than 6 g/W. In addition, the minimum size of one solar panels' surface square measurement is the best by providing at not less than 70 $cm^2$/W and better by providing at not less than 90 $cm^2$/W.

This Second purpose is to attribute better by providing to locate a thermal insulation layer on the backside of solar cells compositing thermal insulation paint or thermoplastic resin encapsulating sheet performing the restraining function for maintaining an external temperature of the devices at lower than 55 degree C. (° C.) in increasing higher a temperature on the surface of solar panels duration of sunshine for the purpose of protecting internal parts against deterioration and/or breaking down of Power storage and generation system caused by internal and external thermal increase, and by providing at lease one of devices such as thermal sensors, cooling fan operating system starting its system by the temperature detection at 50 degree C. (° C.) level, Internal temperature protecting system by the temperature detection at 5 degree C. (° C.) level, power storage volume ratio controlling discharge possible voltage and electric current for power storage battery unit, and a controlling function of indicating figures in generating electric power with solar cells in Claim 14. This figures' indication system of electric power generation with solar cells is feasible in LCD panel indication by cable or radio method.

The thermal insulation layer on the backside of solar cells compositing thermal insulation paint or thermoplastic resin encapsulating sheet are listed same as described above.

On the other hands, stable and steady operations of Signals established in cold districts are maintained under the conditions of mounting radiation sheets operated with electric supply from solar cell power generation on backside of signal lights part in controlling the optimum temperature at not less than 15 degree C. (° C.) through starting to operate a radiation on the sheets by detecting the temperature at not higher than 5 degree C. (° C.) with an outside temperature sensor. In particular, LED using in Signal for energy-saving purpose have extremely less radiation of heat which leads out icing on the surface of Signals' LED parts to be hard in looking, and for avoidance of the icing the radiation sheet operating system is feasible.

This Second purpose is to attribute better by providing a light weight and small size form of complete water-proof type box making up in one or two panels in range of 5 to 50 W each and also this box form in not wider than 50 mm thickness in each panel unit, and in portable type is handled easily in mounting on the poles described in Claim 12 by hands on weights of not more than 300 g/W per maximum power output of solar cell panel unit in Claim 15.

Hereinwith, a thickness of one box unit is better for not wider than 40 mm thickness and the best for not wider than 35 mm thickness and the weight per maximum power outlet of solar cell panel unit is better for not more than 200 g/W and the best for not more than 150 g/W. The lowest weight per maximum power outlet of solar cell panel unit is better for not less than 50 g/W and the best for not less than 80 g/W. As an example, the overall weight of solar cell panels in one set of two panels which length and breadth is less than 40 mm respectively at 12V 120 W specification is better for not more than 5 kgs.

This Second purpose is to attribute better by providing Signal UPS power supply system installing the Solar Power generation and storage packaged panels described in Claim 12 to 15 with the Power generation and storage packaged apparatus station mounting at least one of devices such as Signal LED diodes freezing protection function by involving a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and involving various power generators controlling functions of Power generation operation—storage or supplementary charging—discharging operations on standing street lights and/or telegraph poles installing solar cell or wind power units as their supplementary power source, and combining with solar cells or wind power or wave activating power generation as natural energy generation apparatus or fuel cells to be enhanced overall power generation capacity in Claim 16.

This Second purpose is to attribute better by providing Signal UPS power supply system installing the Solar Power generation and storage packaged panels described in Claims 12 to 16 with the Power generation and storage packaged apparatus station mounting at least one of devices such as Signal LED diodes freezing protection function by involving a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and involving various power generators controlling functions of Power generation operation—Storage or supplementary charging—discharging operations on standing street lights and/or telegraph poles installing solar cell or wind power units as their supplementary power source, and in a solar power generation the best efficient rate of solar cell generation is attributed better by utilizing an angle adjustment stand of sunshine elevation on a flat location to keep the best angle of sunshine through a year or a remote control apparatus of the sunshine angle adjustment, and combining with solar cells and/or wind power or wave activating power generation as natural energy generation apparatus or fuel cells to be enhanced overall power generation capacity in Claim 17.

This Second purpose is to attribute better by providing Signal UPS power supply system installing Power generation and storage packaged apparatus station combining Intelligent function installing Power storage and generation system described in Claim 12 to 17 with various environmentally compatible power generators involving conventional power generation and storage apparatus and the power generation and storage unit size of power generators is possible to be mounted as small size power generation and storage unit to obtain a reduction rate in not less than 50% of measurement size and in light weight at not more than one Second (½) weight in comparison with that of lead acid storage battery and also to be set feasibly and directly on Signal apparatus parts without limiting a transfer and/or a setting location of power storage batteries at disaster areas.

In this invention, the Signal UPS power generation and storage system is obtained by installing Intelligent function installing Power storage and generation system and/or solar power generation and storage packaged panels installed jointly in light weight and portable form as well as controlling system in charge-discharge, power generation and supplementary charge-discharge operations as specifically efficient roles at electric blackout in the disaster prevention or the emergency disaster events, of which functions are sure to be secured the safety and security of pedestrians and for avoidance of traffic accidents by maintaining operation of signals at emergency disaster events.

The following drawings and embodiments are provided to illustrate the intelligent function installing Power storage and generation system and/or Solar Power storage and generation packaged panel system which is the first aspect of this invention.

This invention is characterized in the light and compact intelligent function installing Power generation and storage system and/or solar power generation and storage packaged panel system involving supplemental charge-discharge functions, packaging battery unit (1), Charge-Discharge Control Unit (2), system control unit (3), currency control unit interface parts (4).

In order to make such a light and compact system and/or panel system, it is best to make a battery unit (1) light and compact. To do so, it is preferable to install a light and compact lithium ion secondary battery. As the lithium ion secondary battery, the lithium ion battery (LIB) is better especially with a light weight and compact LIB module in 12V as three cells package of 4V each cell or one package 12V cell which are ones of examples, of which unit is safely operated by Protection circuit against over-charge and over-discharge operations, and thermal fuse for a protection and detection against IC circuit system destroy in a aluminum laminated package.

The first aspect of this invention is illustrated based on the following embodiments.

Embodiment 1 (Embodiment of Station)

Solar Power generation and storage packaged panels of this invention is used as station, combining with a environmentally compatible power generators as defined in claim 8. As a battery unit (1), light and compact portable type battery module described previously as the LIB module is used, that is, the two battery unit boxes (1) are installed in by a combination with two of 10 W solar battery modules, light weight and compact DC-DC converter port, light weight and compact AC-DC converter port installed outside of Charge-Discharge control unit (2), the system control unit (3) and the currency control unit interface parts (4) involving DC-AC-inverter system. The total weight of carrier bag comprising this Solar Power generation and storage packaged panel installed 12V 120 W power supply can be not more than 5.5 kg as the standard specification, preferably not more than 5.0 kg, most preferably not more than 4.5 kg.

Embodiment 2 (Embodiment of System and Panel)

At least one module conventional solar battery unit is combined to Solar Power generation and storage system unit of this invention with harness, and by utilizing hinges, collapsible panel system can be obtained. Each panel of the module comprising solar power generation and storage system unit is available also to be removable individually, and to attribute the best efficient rate of solar cell generation better an angle adjustment stand of sunshine elevation on a flat location is utilized to keep the best angle of sunshine through a year in each location.

Besides, by mounting a remote control apparatus of the sunshine angle adjustment at street lights and/or telegraph poles or other high position, the best efficient rate of the generation power can be obtained. In this case, the plural modules of the solar power generation and storage system unit can be combined and the number of the module is not limited.

Embodiment 3 (Embodiment of System and Panel)

Solar battery system comprising at least two modules in which the module has the maximum power generation of at least 5 W/per one panel are prepared. An angle adjustment stand of sunshine elevation on a flat location which is utilized to keep the best angle of sunshine is set up to the back of the solar panel cells. Besides, a grip is provided with carrier bag comprising at least two modules. A hook to fix is provided with the carrier bag not to be opened those panels during carrying condition.

Embodiment 4 (Embodiment of System and Panel)

Hook(s) and/or holding volts tools are installed at not less than 1 m at height, preferably not less than 1.5 m on the wall or pole. The system and/or the panel of this invention is installed with the hook(s) and/or holding volts. In case of installing the system and/or the panel at higher places such as an electric light pole and/or housing roof places, motor operational type controlling apparatus of sunshine elevation angles can be installed at the foot and/or backside of the solar panel boxes to keep the best angle of sunshine.

Embodiment 5 (Embodiment of System and Panel)

In case of lacking the power supply due to the shortage of sunshine time and sunshine strength, a domestic power supply up to 125 volt can be obtained from 100 volt domestic power supply port through conversion apparatus, or the power supply can be obtained from the conventional storage batteries such as lead acid battery, alkaline battery and/or Ni—H battery through DC-AC conversion apparatus, and/or DC-DC currency from vehicle's lead battery. Besides natural energy power supply such as wind-force power supply, wave-force power supply, fuel cell-power supply can be used together.

Embodiment 6 (Embodiment of System and Panel)

In case of happening disaster such as earthquake, typhoon, flood and any other accidents, the system and/or panel(s) of this invention is utilized as emergency power supply and as portable power supply in various fields. As the system and/or panel(s) of this invention is of light weight and its volume is small, it is very useful as small typed portable power supply. For example in case of utilizing 12V 24 W to the power generation and storage packaged panel and/or solar generation and storage packaged panel of this invention of 12V 120 W at least, these power supply can be utilized continuously for not less than 3 hours. In case of 5 W LED lighting, these can be utilized continuously for not less than 20 hours. Further these can be utilized as charge supply power of portable electric appliance such as portable phones from USB port, camera from USB port. And also these can be utilized as working power supply of emergency information board of the disaster, alarming siren and/or signal, and as power supply of emergency communication appliance, digital display appliance. Besides, these can be utilized as emergency power supply of the conventional solar panel and/or wave force light. Furthermore these are in always available situation, and in case of the emergency the necessary amounts of systems and/or panels of this invention are distributed in the accidental place, and these can be utilized as the emergency power supply of the multiple areas covering communication system and as the power supply of night lighting and/or simple heater heating.

Embodiment 7 (Embodiment of System and Panel)

In case of utilizing this invention in rainy days, the system and/or panel(s) of this invention can be water-proof treated The following drawings and embodiments are provided to illustrate Signal UPS system involving Intelligent function installing Power generation and storage system and/or solar power generation and storage packaged panels and UPS equipment installing a blackout detector, which is the second aspect of this invention.

This invention is characterized in Signal UPS system involving the light weight and compact intelligent function installing Power generation and storage system and/or solar power generation and storage packaged panel system involving supplemental charge-discharge functions, packaging battery unit (1), Charge-Discharge Control Unit (2), system control unit (3), currency control unit interface parts (4), and UPS equipment (28) installing a blackout detector In order to make such a light weight and compact Signal UPS system, it is best to install a light weight and compact battery unit. To do so, it is preferable to install a light weight and compact secondary battery. As the secondary battery, lithium ion battery (LIB) is better, especially a light weight and compact LIB module having higher safety structure with three composite battery cell unit in 12V as three cells package of 4V each cell or one package 12V cell which are ones of examples, of which unit is safely operated by Protection circuit against over-charge and over-discharge operations, and thermal fuse for a protection and detection against IC circuit system destroy in a aluminum laminated package.

The second aspect of this invention is illustrated based on the following embodiments.

Embodiment 8 (Embodiment of System and Panel)

In case of lacking the power supply due to the shortage of sunshine time and sunshine strength, the power supply can be obtained from the commercial power supply. Besides, natural energy power supply such as wind-force power supply, wave-force power supply, fuel cell-power supply can be used together.

Embodiment 9 (Embodiment of System and Panel)

In case of happening disaster such as earthquake, typhoon, flood and any other accidents, the Signal UPS system of this invention is utilized as emergency UPS. As the Signal UPS system of this invention is light weight and its volume is small, it is very useful as small typed portable power supply. For example in case of utilizing LED power supply of 12 Wh, and calculating the minimum power supply to 120 Wh, it can be utilized continuously for not less than 8 hours. And also it can be utilized as working power supply of emergency information board of the disaster, alarming siren and/or signal, and as power supply of emergency communication appliance, digital display appliance.

Embodiment 10 (Embodiment of System and Panel)

In case of utilizing the UPS system, the system of this invention can be water proof treated

INDUSTRIAL APPLICABILITY OF THE INVENTION

Intelligent function installing Power generation and storage system and/or solar power generation and storage packaged panels and their installment of Power Station packaged generation and storage functions of this invention is useful especially in the event of disaster emergency, and it is useful as power supply of communication appliance such as portable phones, personal computers, and digital cameras. And also it is useful as power supply of energy sources of night lighting (e.g. human sensitive lighting), hot water heater and heating system.

UPS system installing Power storage and generation system and/or solar power generation and storage packaged panels and their installment of Power Station packaged generation and storage functions is useful especially in the event of disaster emergency, and it is useful as power supply of communication appliance such as portable phones, personal computers, and digital cameras. And also it is useful as power supply of signal at night, rainy days, and/or snow days to protect the safety and easy feeling in the area society.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding Japanese application No. 2010-8528, filed Dec. 10, 2010, Japanese application No. 2011-1088, filed Feb. 10, 2011 and Japanese application No. 2011-178136, filed Jul. 31, 2011, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Intelligent function installing solar power generation and storage packaged panel comprising:
   a charge-discharge control system having a charge-discharge controller for power storage and supplemental charge-discharge functions over the solar power generation and storage packaged panel,
   a lithium ion rechargeable battery performing a power storage function for the charge-discharge control system,
   a protection circuit against over-charge and over-discharge operations,
   a thermal fuse configured to protect an integrated circuit (IC) circuit system by detecting an increase in internal temperature,
   a system control unit involving input-output controller configured to perform a system control to supplement the charge-discharge control system, and
   currency control unit interface parts involving a direct current-alternative current (DC-AC) inverter system configured to operate an interface control between the lithium ion rechargeable battery and the system control unit, in which DC current is steadily supplied directly from the solar power generation and storage packaged panel and AC current is successively or intermittently supplied through the DC-AC inverter system to the charge-discharge control system to charge the lithium ion rechargeable battery.

2. The intelligent function installing solar power generation and storage packaged panel according to claim 1, further comprising at least one of the devices selected from the group consisting of a human sensitive sensor, a brightness sensor, a vibration sensor, a thermal and humidity sensor and a LED lighting system.

3. The intelligent function installing solar power generation and storage packaged panel according to claim 1, further comprising a mounting port of lighting devices, a controller of light operating function with a human sensitive sensor, a brightness controller operating by brightness detection, and also at least one of the devices selected from the group consisting of an external charging port to supplement a shortage of electric power, ports in use available for conventional consumers' electronics, and ports for AC 100V usage, AC 200V three phase, AC voltage ports, external mounting AC-DC converters, and an external mounting DC-DC convertor up to 249 V installed with various connection parts for 12V or 24V power output.

4. The intelligent function installing solar power generation and storage packaged panel according to claim 1, wherein the lithium ion rechargeable battery (LIB) is one selected from the group consisting of cylindrical cans, aluminum square cans, aluminum laminated cells packaged modules and their combination modules and capacitor-condensers installed on the charge-discharge protection circuit.

5. The intelligent function installing solar power generation and storage packaged panel according to claim 1, wherein a thermal insulation layer is provided on a backside of solar cells, the thermal insulation layer comprising thermal insulation paint or a thermoplastic resin encapsulating sheet maintaining an external temperature of the packaged panel at lower than 55 degrees Celsius.

6. The intelligent function installing solar power generation and storage packaged panel according to claim 1, further comprising a light weight portable type carry bag having mounting hand grips and a hook.

7. The intelligent function installing solar power generation and storage packaged panel according to claim 1, wherein the panel comprises two panels, and further comprising mounting hand grips and a hook to prevent opening the two panels.

8. Power generation and storage packaged apparatus Station wherein Intelligent function installing Power generation and storage system and/or solar power generation and storage packaged panel as described in claim 1 is installed with at least one of devices such as Signal LED diodes freezing protection function by installing a temperature controlling sensor, LED lighting devices operating with a human sensitive sensor function, earthquake early warning signal transmission function operated by a seismic triggering sensor, a surveillance camera and video at disaster events, Global Positioning System (GPS) remote communication unit, an emergency warning report system, quick starting system of motors and drives, and the Intelligent function installing Power generation and storage system and/or solar power generation and storage packaged panels is mounted on standing street lights and/or telegraph poles installing solar cell and/or wind power units as their supplementary power source, and it is combined with solar cells and/or wind power or wave activating power generation as natural energy generation apparatus or fuel cells to be enhanced overall power generation capacity.

9. Power generation and storage packaged apparatus Station wherein Intelligent function installing Power generation and storage system and/or solar power generation and storage packaged panel as described in claim 1 is installed with at least one of devices such as Signal LED diodes freezing protection function by installing a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and mounting the Intelligent function installing Power generation and storage system and/or solar power generation and storage packaged panels on standing street lights and/or telegraph poles installing solar cell and/or wind power units as their supplementary power source, and in a solar power generation the best efficient rate of solar cell generation is attributed better by utilizing an angle adjustment stand of sunshine elevation on a flat location to keep the best angle of sunshine through a year or a remote control apparatus of the sunshine angle adjustment mounted at street lights or telegraph poles or other high position, and combining with solar cells and/or wind power or wave activating power generation as natural energy generation apparatus or fuel cells to be enhanced overall power generation capacity.

10. Power generation and storage packaged apparatus Station wherein Intelligent function installing Power generation and storage system and/or solar power generation and storage packaged panel as described in claim 1 is installed with various environmentally compatible power generators and the power generation and storage unit size of conventional power generator is a small size power generation and storage apparatus possible reduction rate in not less than 50% of measurement size and in light weight at not more than one Second (½) weight in comparison with that of lead acid storage battery and also setting feasibly at height of not lower than 150 cm required for a flood disaster prevention or limiting a transfer and/or a location condition of power storage batteries in disaster area.

11. Power generation and storage packaged apparatus Station wherein Intelligent function installing Power generation and storage system and/or solar power generation and storage packaged panel as described in claim 1 is installed with various environmentally compatible power generators such as solar cells and/or wind force power or wave force power generation as natural energy generation apparatus or fuel cells to be enhanced overall power generation capacity and the power generation and storage unit size of power generators is a power generation and storage apparatus possible reduction rate in not less than 50% of measurement size and in light weight at not more than one Second (½) weight in comparison with that of lead acid storage battery and also setting feasibly at height of not lower than 150 cm required for a flood disaster prevention or limiting a transfer and/or a location condition of power storage batteries in disaster area.

12. Signal Uninterruptible Power Supply (UPS) system wherein Intelligent function installing Power generation and storage system and/or solar power generation and storage packaged panel as described in claim 1 is installed with UPS equipment (28) installing a blackout detector.

13. Signal UPS system according to claim 12, wherein lithium ion rechargeable battery (LIB) of battery (1) is one of devices selected from the group consisting of cylindrical cans, aluminum square cans, aluminum laminating cells packaged modules and their combination modules and also LIBs or capacitor-condensers are installed charge-discharge protection circuits, thermal fuses and thermistor in light weight battery cell at less than 10 g/Watt, and those solar panels are specified in small portable size and the "Pm" in range of 5 W to 50 W in each panel unit and surface square measurement in less than 110 $cm^2$/W and the thickness of the solar panel's frame in less than 50 mm.

14. Signal UPS system according to claim 12, wherein it is providing to locate a thermal insulation layer on the backside of solar cells compositing thermal insulation paint or thermoplastic resin encapsulating sheet performing the restraining function for maintaining an external temperature of the devices at lower than 55 degree C. (° C.) in increasing higher a temperature on the surface of solar panels duration of sunshine for the purpose of protecting internal parts against deterioration and/or breaking down of Power generation and storage system caused by internal and external thermal increase, and by providing at lease one of devices such as thermal sensors, cooling fan operating system starting its system by the temperature detection at 50 degree C. (° C.) level, Internal temperature protecting system by the temperature detection at 5 degree C. (° C.) level, power storage volume ratio controlling discharge possible voltage and electric current for power storage battery unit, and a controlling function of indicating figures in generating electric power with solar cells.

15. Signal UPS system according to claim 12, wherein it is installed with light weight and small size form of complete water-proof type box making up in one or two panels in range of 5 to 50 W each and also this box form in not wider than 50 mm thickness in each panel unit, and in portable type is handled easily in mounting on the poles by hands on weights of not more than 300 g/W per maximum power output of solar cell panel unit.

16. Signal UPS system according to claim 12, wherein it is installed with the Power generation and storage packaged apparatus station mounting at least one of devices such as Signal LED diodes freezing protection function by involving a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and involving various power generators controlling functions of Power generation operation-storage or supplementary charging-discharging operations on standing street lights and/or telegraph poles installing solar cell and/or wind power units as their supplementary power source, and combining with solar cells and/or wind power or wave activating power generation as natural energy generation apparatus or fuel cells to be enhanced overall power generation capacity.

17. Signal UPS system according to claim 12, wherein it is installed with the Power generation and storage packaged apparatus station mounting at least one of devices such as Signal LED diodes freezing protection function by involving a temperature controlling sensor, LED lighting devices operating with a human sensitive sensor function, earthquake early warning signal transmission function operated by a seismic triggering sensor, a surveillance camera and video at disaster events, GPS remote communication unit, an emergency warning report system, quick starting system of motors and drives, and involving various power generators controlling functions of Power generation operation—Storage or supplementary charging—discharging operations on standing street lights and/or telegraph poles installing solar cell and/or wind power units as their supplementary power source, and in a solar power generation the best efficient rate of solar cell generation is attributed better by utilizing an angle adjustment stand of sunshine elevation on a flat location to keep the best angle of sunshine through a year or a remote control apparatus of the sunshine angle adjustment, and combining with solar cells and/or wind power or wave activating power generation as natural energy generation apparatus or fuel cells to be enhanced overall power generation capacity.

18. The intelligent function installing solar power generation and storage packaged panel according to claim 1, wherein the storage packaged panel is configured to be carried.

* * * * *